(12) United States Patent
Lin

(10) Patent No.: US 11,618,287 B2
(45) Date of Patent: Apr. 4, 2023

(54) BLUETOOTH TIRE PRESSURE MONITORING SYSTEM

(71) Applicant: Shih-Yao Lin, Taipei (TW)

(72) Inventor: Shih-Yao Lin, Taipei (TW)

(73) Assignee: SYSGRATION LTD., Taipei (TW)

( * ) Notice: Subject to any disclaimer, the term of this patent is extended or adjusted under 35 U.S.C. 154(b) by 0 days.

(21) Appl. No.: 17/355,197

(22) Filed: Jun. 23, 2021

(65) Prior Publication Data

US 2022/0161613 A1 May 26, 2022

(30) Foreign Application Priority Data

Nov. 20, 2020 (TW) .................................. 109215318

(51) Int. Cl.
*B60C 23/04* (2006.01)

(52) U.S. Cl.
CPC ...... *B60C 23/0433* (2013.01); *B60C 23/0479* (2013.01)

(58) Field of Classification Search
CPC ...... B60C 23/00; B60C 23/02; B60C 23/0433
USPC ................................................ 340/442, 447
See application file for complete search history.

(56) References Cited

U.S. PATENT DOCUMENTS

| | | | |
|---|---|---|---|
| 6,445,287 B1 * | 9/2002 | Schofield | B60C 23/00 340/447 |
| 7,541,919 B1 * | 6/2009 | Huang | B60C 23/0433 340/693.9 |
| 8,935,956 B2 * | 1/2015 | Yu | B60C 23/0494 73/146 |
| 9,444,945 B1 * | 9/2016 | Verma | H04M 11/04 |
| 9,481,216 B2 * | 11/2016 | Chow | B60C 23/20 |
| 9,802,447 B2 * | 10/2017 | Petrucelli | B60C 23/0408 |
| 2005/0274166 A1 * | 12/2005 | Wu | G01L 17/00 73/1.63 |
| 2005/0274442 A1 * | 12/2005 | Huang | B60C 23/0408 152/415 |
| 2006/0087419 A1 * | 4/2006 | Peng | B60C 23/0408 701/31.4 |
| 2006/0208865 A1 * | 9/2006 | Quach | B60C 23/009 340/447 |
| 2008/0252435 A1 * | 10/2008 | Chien | B60C 23/0408 340/447 |
| 2009/0224901 A1 * | 9/2009 | Yu | B60C 23/0479 340/447 |
| 2009/0315697 A1 * | 12/2009 | Huang | B60C 23/0406 340/447 |
| 2010/0207753 A1 * | 8/2010 | Sugiura | B60C 23/0433 340/447 |
| 2012/0204634 A1 * | 8/2012 | Yu | B60C 23/0494 73/146.8 |
| 2013/0009762 A1 * | 1/2013 | Yu | B60C 23/0494 340/442 |

(Continued)

*Primary Examiner* — Eric Blount

(57) ABSTRACT

A Bluetooth tire pressure monitoring system (TPMS) includes a sensing host and a receiving host, and the sensing host includes a battery, a control unit, a Bluetooth transceiver unit, a boost/regulation circuit, a pressure sensing unit, an operational amplifier, a gravity sensing unit, a temperature sensing unit and a Bluetooth antenna. The Bluetooth TPMS utilizes low-power Bluetooth wireless communication technology to transmit and receive signals, so as to meet the requirement in low power consumption.

7 Claims, 8 Drawing Sheets

(56) References Cited

U.S. PATENT DOCUMENTS

| | | | |
|---|---|---|---|
| 2013/0204486 A1* | 8/2013 | Yu | B60C 23/0452 |
| | | | 701/32.7 |
| 2014/0172342 A1* | 6/2014 | Yu | B60C 23/0471 |
| | | | 702/104 |
| 2015/0283868 A1* | 10/2015 | Chow | B60C 23/0462 |
| | | | 340/447 |
| 2017/0180917 A1* | 6/2017 | Steiner | H04W 64/00 |
| 2019/0073887 A1* | 3/2019 | Nagata | G08B 13/2462 |

* cited by examiner

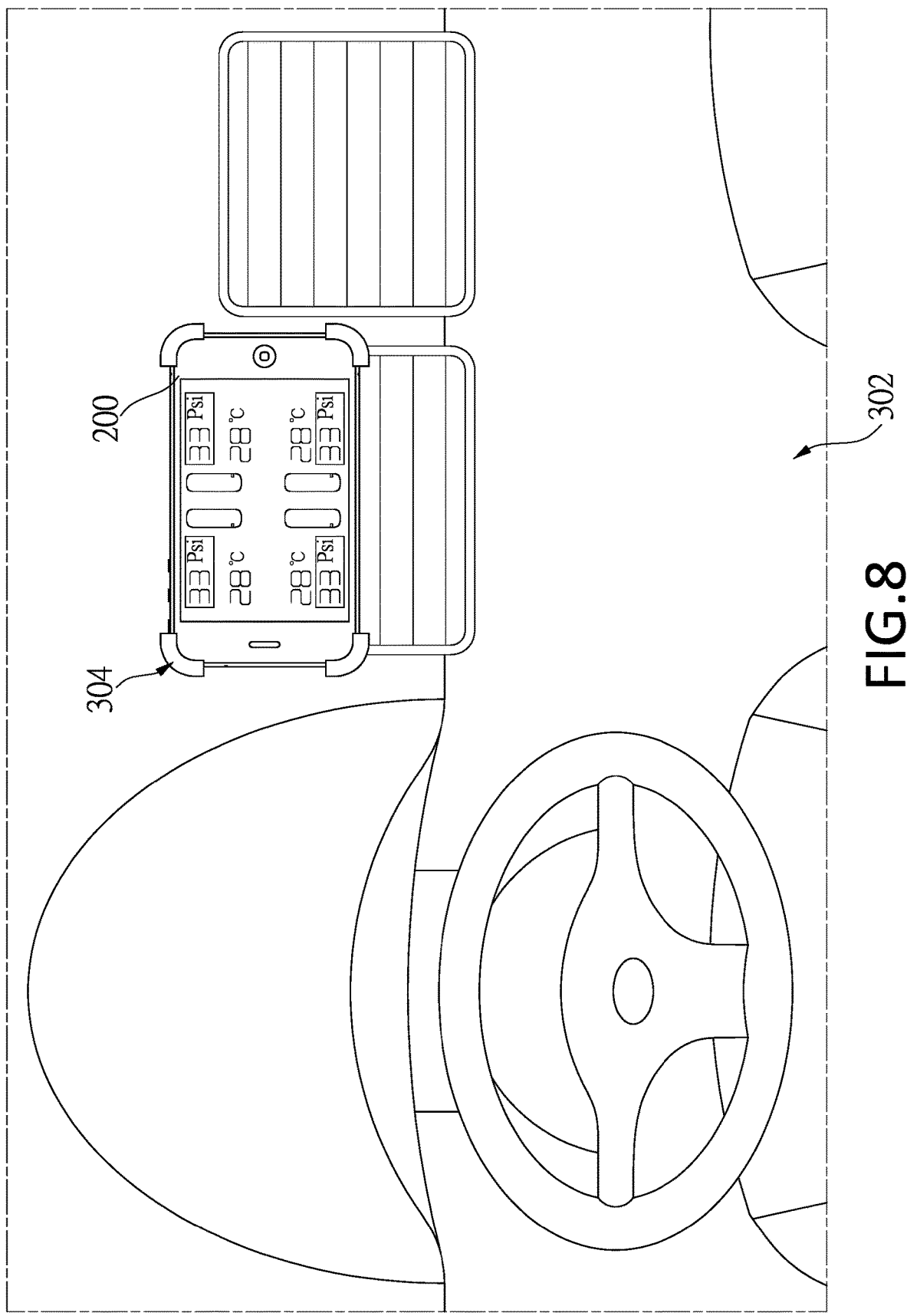

BLUETOOTH TIRE PRESSURE MONITORING SYSTEM

BACKGROUND OF THE INVENTION

1. Field of the Invention

The present invention is related to a tire monitoring system, and more particularly to a tire pressure monitoring system technology using Bluetooth to transmit and receive signals.

2. Description of the Related Art

Maintaining tires of vehicle with correct driving tire pressures is the main condition for maintaining tire performance. The tire with a correct tire pressure can provide longer service life, rapid steering response, better fuel efficiency and smoothness driving quality, compared to the tire with an insufficient tire pressure. The insufficient or excessively-high tire pressure may cause abnormal wear and abnormal tire performance; the tire with severely insufficient tire pressure may occur wrinkles during the rolling process, and it causes repeated tire deformations during long-distance driving, and severe cases may occur burst of the tire to cause traffic accidents during driving.

When a tire has an insufficient tire pressure, the internal pressure and temperature of the tire may change, so many companies have developed quite a lot of mature tire-pressure monitoring systems (TPMS) to measure the air pressure and temperature in the tire, so that a driver can conveniently obtain the pressure and temperature of the tire at any time and understand the operation status of each tire in real time. The aforementioned tire-pressure monitoring system sensing the air pressure and temperature of tire can transmit/receive wireless signals through 315 MHz or 434 MHz frequency band. However, in the transmission and reception of this wireless signal, for example, the 315 MHz wireless signal transmission operated in a voltage of 3 V to 12V requires an operation current of 20 mA to 28 mA, so the above-mentioned conventional wireless signal transmission technology needs to be improved for the current demand for small volume and low energy consumption.

SUMMARY OF THE INVENTION

An objective of the present invention is to provide a Bluetooth TPMS which mainly uses Bluetooth low energy (BLE) wireless communication technology as a signal transmission and reception technology, so as to solve the conventional problem.

In order to achieve the aforementioned objective and effect, the present invention provides a Bluetooth TPMS, the CopyClaim1?.

BRIEF DESCRIPTION OF THE DRAWINGS

The structure, operating principle and effects of the present invention will be described in detail by way of various embodiments which are illustrated in the accompanying drawings.

FIG. 8 is a schematic diagram showing a receiving host movably mounted in a cabin of a vehicle, according to the present invention.

DETAILED DESCRIPTION OF THE PREFERRED EMBODIMENTS

Figure 1:
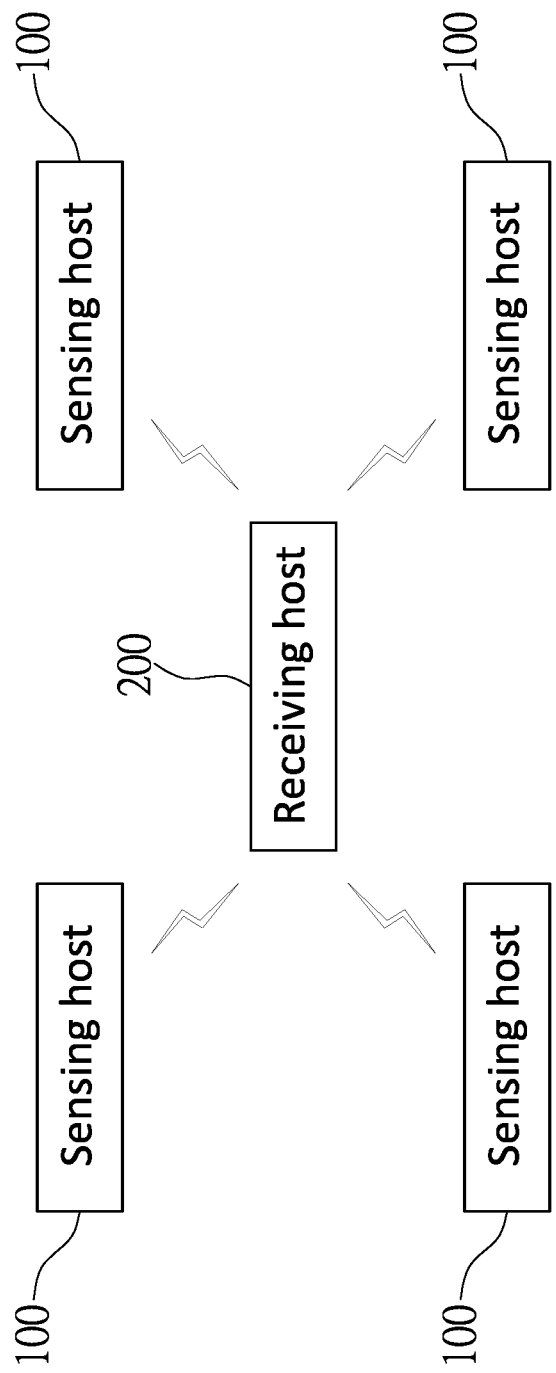
FIG. 1 is a block diagram of a Bluetooth TPMS of the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. I As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Figure 2:
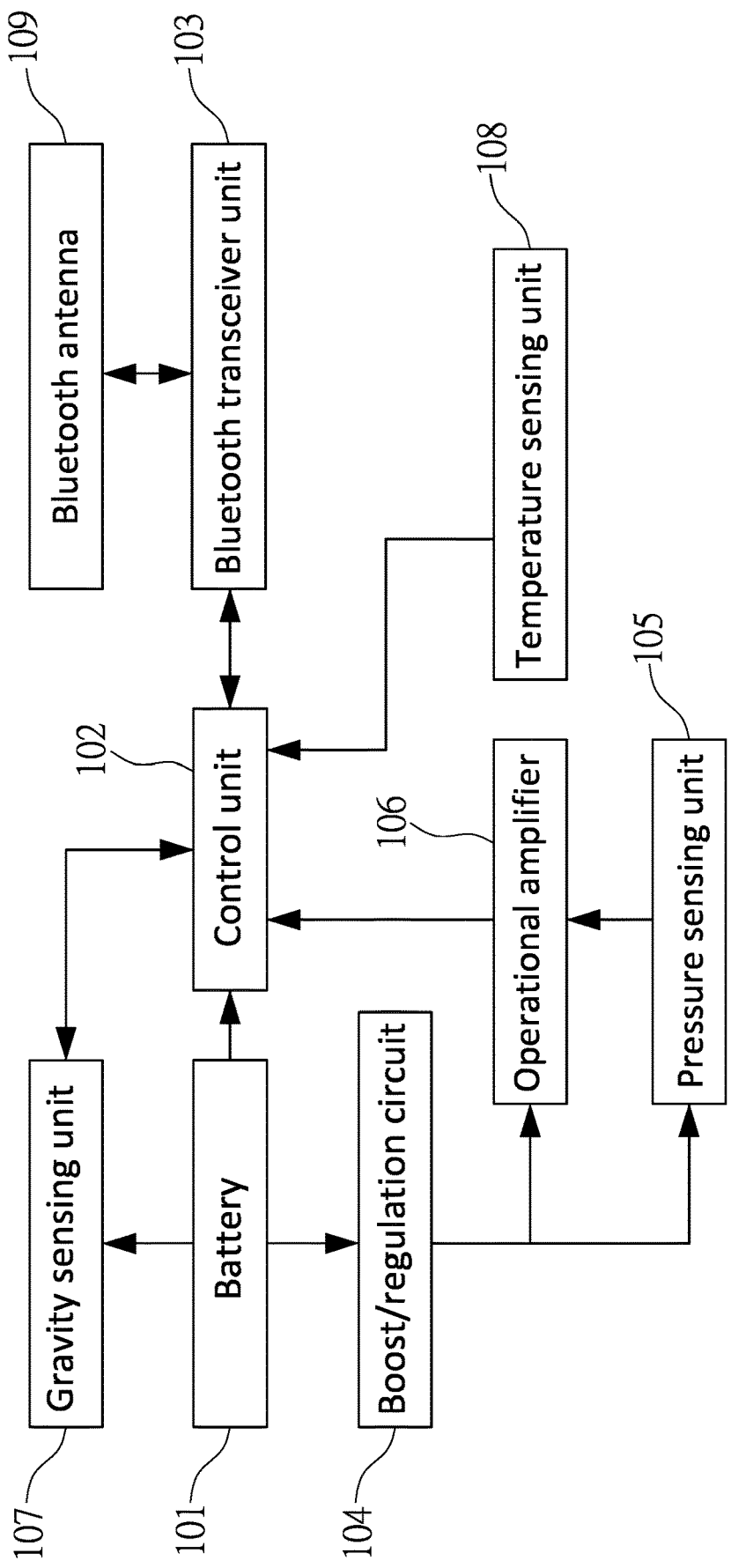
FIG. 2 is a schematic circuit block diagram of a sensing host of the present invention.

Please refer to FIGS. 1 and 2, which show a Bluetooth TPMS including a plurality of sensing hosts 100 and a receiving host 200. Each of the plurality of sensing hosts 100 includes a battery 101, a control unit 102, a Bluetooth transceiver unit 103, a boost/regulation circuit 104, a pressure sensing unit 105, an operational amplifier 106, a gravity sensing unit 107, a temperature sensing unit 108 and a Bluetooth antenna 109. The Bluetooth transceiver unit 103 sends transmission information including a tire pressure and a tire temperature to the receiving host 200 through the Bluetooth antenna 109. In an embodiment, transmission information can include data of remaining battery power.

The sensing host 100 of the present invention uses the Bluetooth transceiver unit 103 to send the transmission information to the receiving host 200, and the maximum operation current the Bluetooth transceiver unit 103 in an operation voltage of 3.6V does not exceed 15 mA; therefore, compared with the conventional 315 MHz/434 MHz wireless signal transmission receiving technology requiring the operation current of 20 mA to 28 mA, the present invention indeed meets the requirement in low power consumption, and the sensing host 100 can have a longer usage time with the battery capacity the same as that of known technology.

Figure 3:
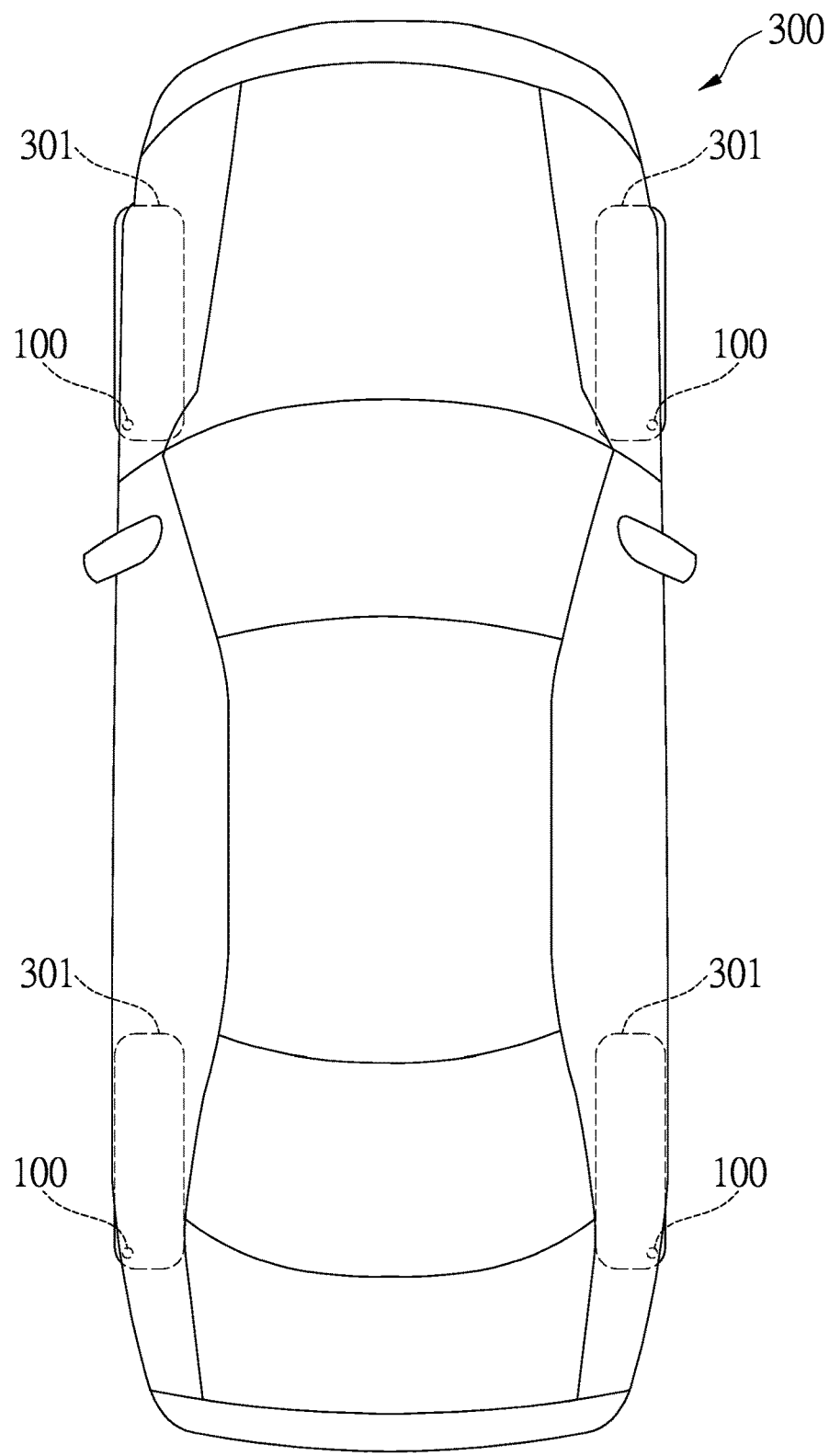
FIG. 3 is a schematic diagram showing that four sensing hosts are mounted on a vehicle, according to the present invention.
Figure 4:
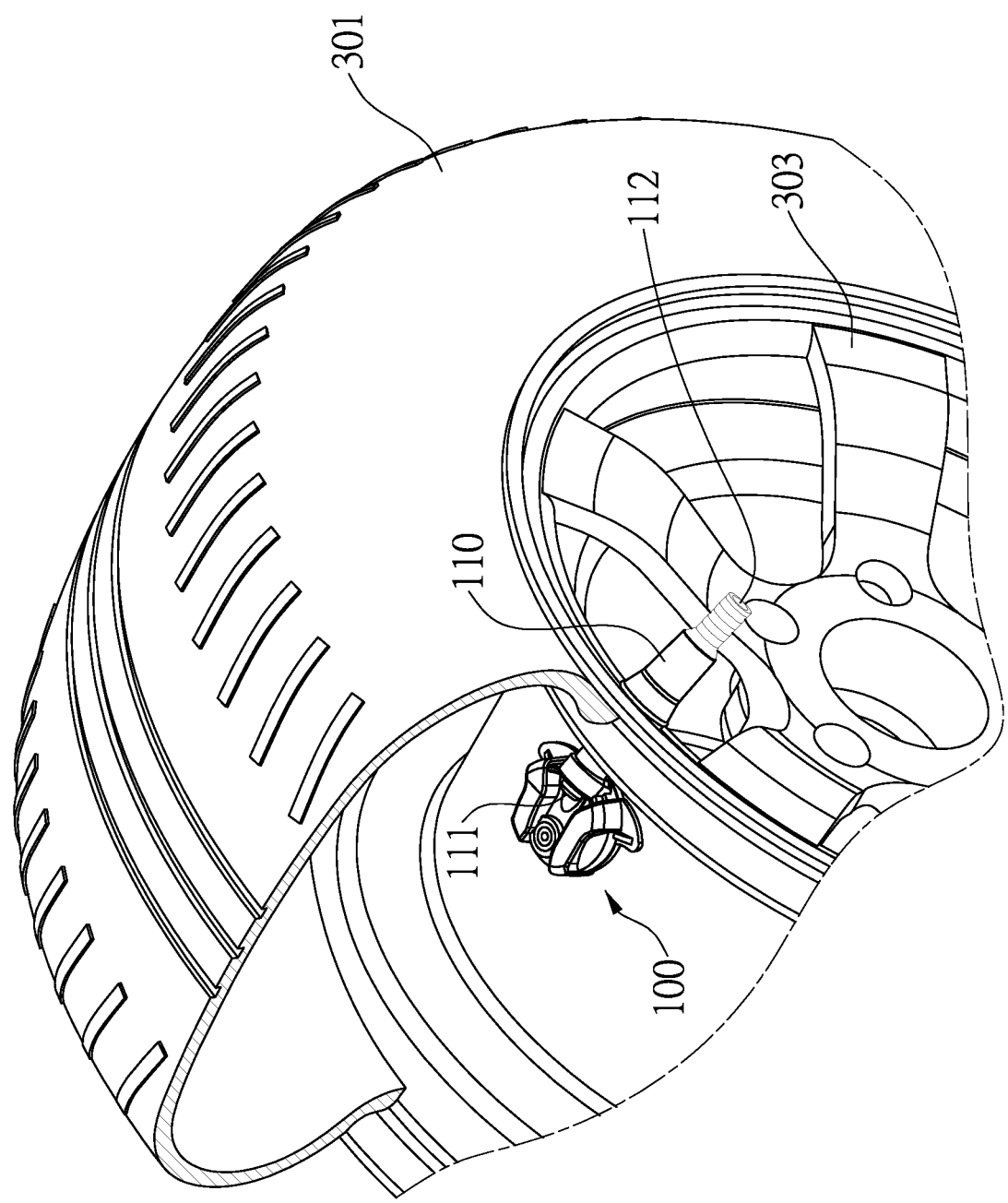
FIG. 4 is a schematic diagram showing that a sensing host is mounted in a tire frame through a nozzle, according to the present invention.
Figure 5:
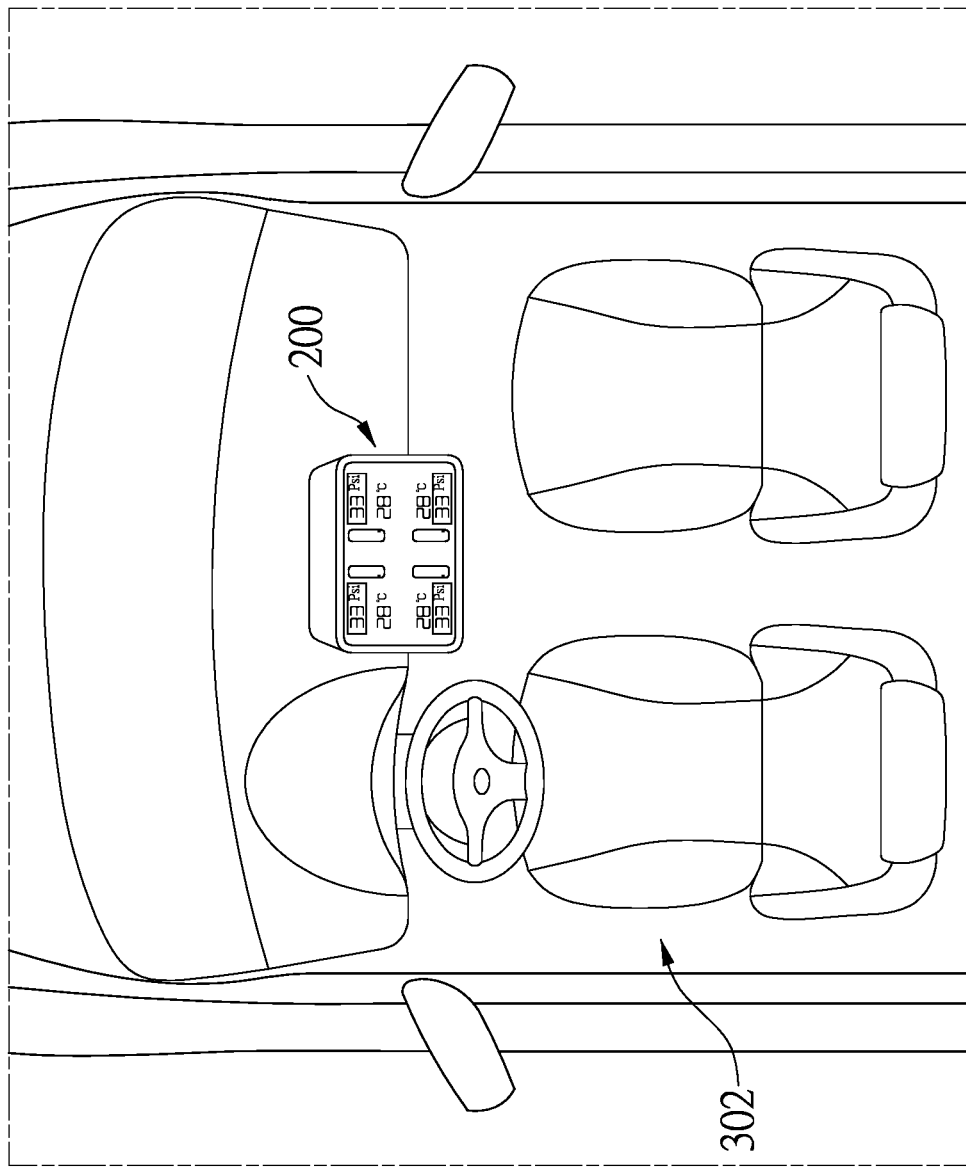
FIG. 5 is a schematic diagram showing a receiving host mounted in a cabin of a vehicle, according to the present invention.

Please refer to FIGS. 3 to 5. The Bluetooth TPMS of the present invention can be applied to a vehicle 300 and includes four sensing hosts 100 in cooperation with a receiving host 200, and the four sensing hosts 100 sense conditions of four tires 301, respectively. The receiving host 200 is fastened in a cabin 302 of a vehicle 300, each of the sensing hosts 100 is assembled with a nozzle 110, and an air outlet 111 of the nozzle 110 is inserted into and mounted with a tire frame 303, so that a portion of the air inlet 112 of the nozzle 110 is expose out of the tire frame 303. Each sensing hosts 100 is fastened inside the tire frame 303, and enclosed by the tire 301 assembled in the tire frame 303. As shown in FIG. 4, the sensing host 100 is applied to a built-in tire pressure sensor.

Figure 6:
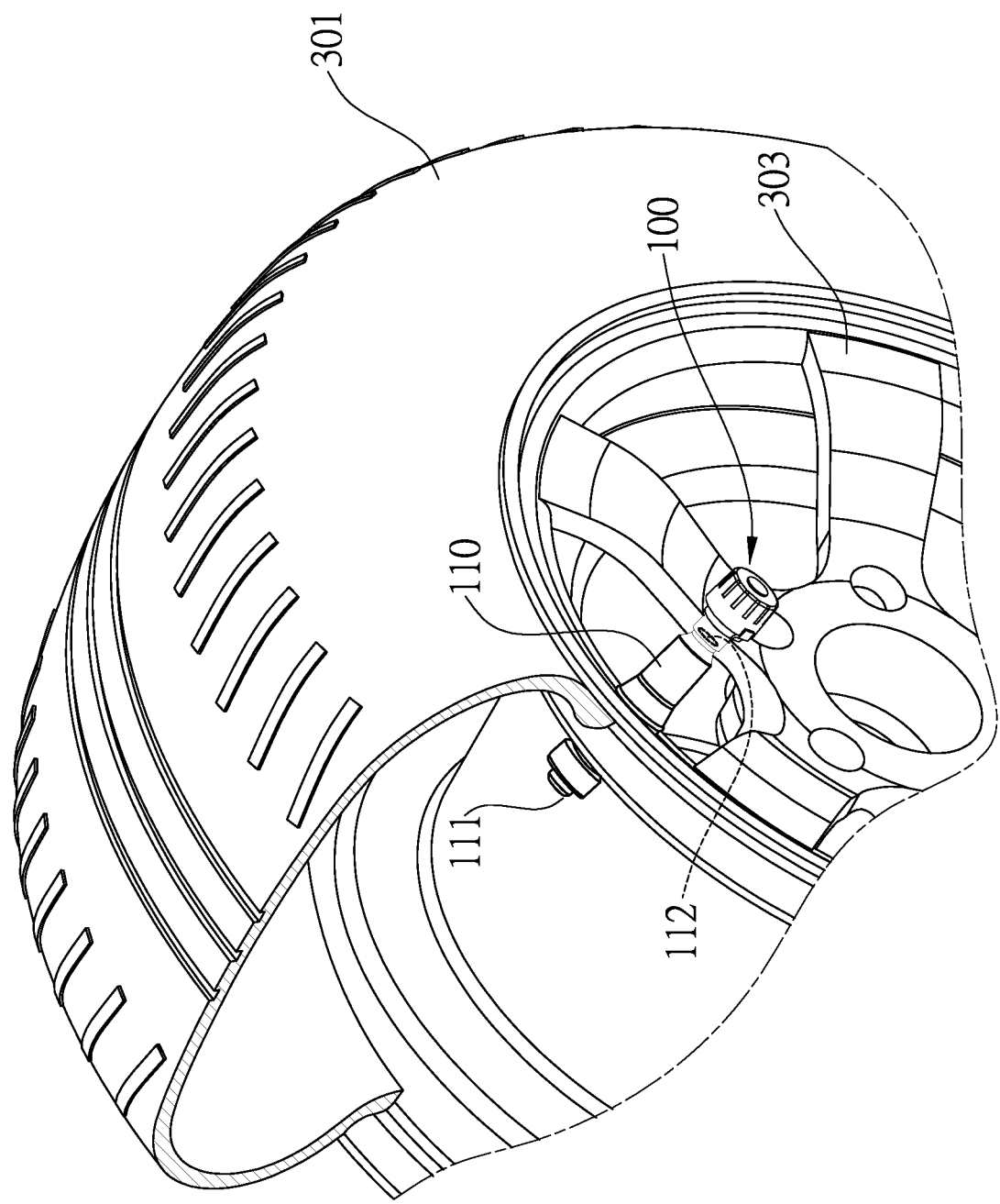
FIG. 6 is a schematic diagram showing a sensing host mounted with a nozzle and exposed out of a tire frame, according to the present invention.
Figure 7:
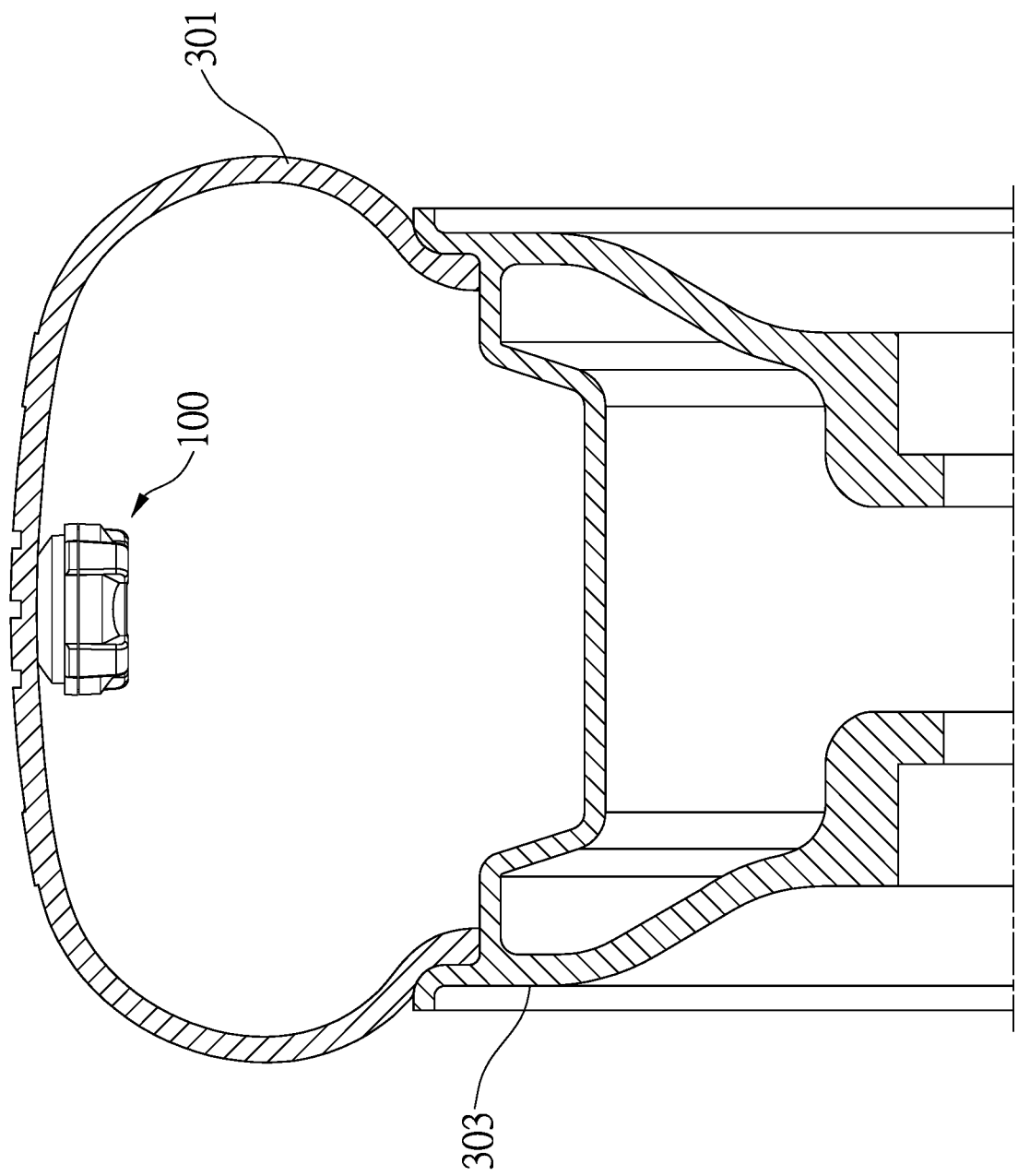
FIG. 7 is a schematic diagram showing a sensing host mounted with an inner wall of the tire, according to the present invention.

Besides being applied to aforementioned built-in tire pressure sensor, the sensing host 100 of the present invention can be applied to two another sensor types. Please refer to FIG. 6. The sensing host 100 is assembled at the air inlet 112 of the nozzle 110, each sensing host 100 is exposed out of a tire frame 303 and configured to sense a tire 301 assembled with the tire frame 301, and an air outlet 111 of the nozzle 110 is disposed in the tire frame 303 and enclosed by the tire 301; the sensing host 100 shown in FIG. 6 is applied to a tire-outside tire pressure sensor. Please refer to FIG. 7. As shown in FIG. 7, the sensing host 100 is fastened on an inner wall of the tire 301, and the sensing host 100 is applied to a tire-inside tire pressure sensor.

Please refer to FIG. 8. when the receiving host 200 is a mobile handheld device, the receiving host 200 can be mounted and located in a cabin 302 of the vehicle 300 by a clamping device 304. The mobile handheld device can be pre-installed with one of iOS, Android and Windows operating systems. When the parked vehicle 300 occurs abnormal vibration, the gravity sensing unit 107 can sense an abnormal condition and send transmission information including the abnormal condition to the receiving host 200 through Bluetooth transceiver unit 103 and Bluetooth antenna 109; when the sensing host 100 is within an effective distance of the sensing host 100, the transmission information can be sent to the carry-on mobile handheld device (that is, the receiving host 200) to warn a driver about the abnormal condition of the vehicle.

Besides, when the receiving host 200 is a mobile handheld device, the receiving host 200 can send information through the Bluetooth transceiver unit 103 and the Bluetooth antenna 109, and the information can be reminded by graphics acoustic or sound based on magnitude of the transmitting signal between the receiving host 200 and the sensing host 100. When the driver carries the mobile handheld device (that is, the receiving host 200), the receiving host 200 can receive the information within the effective distance thereof, and set, store or output message to notify parking location information of the vehicle 300 such as GPS, coordinate information, or street or address in map. Even when the abnormal signal or flat tire occurs, the parking location information can be transmitted through the communication software in the mobile handheld device (that is, receiving host 200 carried by a driver), to an assistant, repair or ambulance unit to request assistance or get out of trouble.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A Bluetooth tire pressure monitoring system (TPMS) comprising a plurality of sensing hosts and a receiving host, wherein each of the plurality of sensing, hosts comprises a battery, a control unit, a Bluetooth transceiver unit, a boost/regulation circuit, a pressure sensing unit, an operational amplifier, a gravity sensing unit, a temperature sensing unit, and a Bluetooth antenna, the boost/regulation circuit is electrically connected to the battery, the operational amplifier and the pressure sensing unit respectively, a maximum operation current of the Bluetooth transceiver unit in an operation voltage of 3.6V does not exceed 15 mA, and the Bluetooth transceiver unit sends transmission information comprising a tire pressure and a tire temperature to the receiving host through the Bluetooth antenna.

2. The Bluetooth TPMS according to claim 1, wherein the transmission information comprises data of remaining battery power.

3. The Bluetooth TPMS according to claim 1, wherein the receiving host is disposed in a cabin of a vehicle.

4. The Bluetooth TPMS according to claim 1, wherein the receiving host is a mobile handheld device.

5. The Bluetooth TPMS according to claim 1, wherein each of the plurality of sensing hosts is assembled with a nozzle which is insert and mounted on a tire frame, and a portion of the nozzle is exposed out of the tire frame, and each of the plurality of sensing hosts is fastened inside the tire frame and enclosed by a tire assembled in the tire frame.

6. The Bluetooth TPMS according to claim 1, wherein each of the plurality of sensing hosts is assembled with an air inlet of a nozzle, each of the plurality of sensing hosts is expose out of a tire frame and configured to sense a tire assembled with the tire frame, and an air outlet of the nozzle is disposed in the tire frame and enclosed by the tire.

7. The Bluetooth TPMS according to claim 1, wherein each of the plurality of sensing hosts is fastened on an inner wall of a tire.

* * * * *